Patented Feb. 16, 1926.

1,573,083

UNITED STATES PATENT OFFICE.

JOHN WESLEY MARDEN AND CLETUS CLINTON VAN VOORHIS, OF EAST ORANGE, NEW JERSEY, ASSIGNORS TO WESTINGHOUSE LAMP COMPANY, A CORPORATION OF PENNSYLVANIA.

PROCESS FOR THE PRODUCTION OF METALS.

No Drawing.   Application filed June 13, 1921. Serial No. 477,267.

*To all whom it may concern:*

Be it known that we, JOHN WESLEY MARDEN, a citizen of the United States, and a resident of East Orange, in the county of Essex and State of New Jersey, and CLETUS CLINTON VAN VOORHIS, a citizen of the United States, and a resident of East Orange, in the county of Essex and State of New Jersey, have invented a new and useful Improvement in a Process for the Production of Metals, of which the following is a specification.

This invention relates to methods of obtaining metals from their compounds and more particularly from their oxides.

An object of the present invention is the provision of a direct and economical method for the production of metals in a high state of purity.

Another object of this invention is the provision of a process particularly applicable to the production of metals from difficultly reducible oxides, sometimes called the refractory oxides, such as those of zirconium, uranium, thorium, vanadium, tantalum, chromium, etc.

Other objects of the invention will be apparent from a reading of the following specification.

For the reduction of metallic oxides, especially those which are difficultly reducible, such as the oxides of zirconium, uranium, thorium, etc., and which can not be reduced by ordinary reagents, such as hydrogen or carbon, the use of calcium as the reducing agent has been proposed, and, for the reduction of certain of those oxides, the alkali metals have been used. The calcium method is open to the objection of the relative expensiveness of that metal and the impurities contained in the commercial material, while the alkali metals are limited in use because of their inability to reduce many oxides.

The objections to those previous methods are avoided in the present invention by which substantially all metals may be reduced and obtained in a high state of purity.

We have discovered that metallic oxides, except those of the alkali metals, may be reduced by the combined action of a halide of an alkali metal or alkaline earth metal, and an alkali metal other than that of the halide employed.

In practicing our invention we prefer to make a mixture of a metallic oxide, an alkali metal, and either an alkali metal halide or an alkaline earth halide, the latter two constituents being preferably in excess of the theoretical quantity required. This mixture is heated in a suitable vessel to its reaction temperature. The reaction quickly completes itself and the resulting products, when cooled, are treated to eliminate all substances except the metal desired.

To enable those skilled in the art to practice our invention, we will describe, in detail, one method of applying the principle involved, and, for this purpose, will select zirconium oxide as an example of a difficultly reducible oxide, barium chloride as a metallic halide and sodium as an alkali metal.

In a suitable mixing or grinding machine an intimate mixture is made of 100 grams of sodium in a finely divided state, 470 grams of pulverized barium chloride which has been previously fused and 75 grams of granulated zirconium oxide. The amount of sodium and barium chloride used is about 100% in excess of the theoretical quantity, as an excess of these materials has been found to give the best results in practice. The mixture thus obtained is placed in a vessel suitable for the reaction of the materials used which may be an iron crucible or bomb adapted to be closed air-tight by a cover furnished with a valve through which the air of the vessel may be withdrawn and, if desired, and inert atmosphere admitted after the exhaustion. The vessel is then heated by any suitable means to a bright red heat and maintained thereat during the time required for completion of the reaction.

The reaction which takes place may be illustrated by the following equation:

(1) 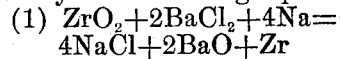

The mechanism of the reaction represented by the above equation probably involves a primary and a secondary reaction, the former of which may be represented by the equation:

(2) $2BaCl_2 + 4Na \rightleftharpoons 4NaCl + 2Ba$;

and the latter may be represented by the equation:

(3) $2Ba + ZrO_2 = 2BaO + Zr$

The reaction represented by equation (2) is reversible and the reaction does not proceed very far to the right before an equilibrium is established. In other words, a reaction between barium chloride and metallic sodium liberates only a relatively small quantity of barium. However, in the presence of a metallic oxide, the barium liberated reduces such oxide to the metallic state, forming, in this instance, barium oxide and metallic zirconium, as expressed in equation (3). The removal of the barium from the right side of equation (2), by combination with the zirconium oxide, disturbs the equilibrium of the reaction illustrated by equation (2) and allows the reaction to proceed further towards the right, that is, results in the production of more barium. This cyclic process is thus contained until all the zirconium oxide present is reduced.

An alternative theory to explain the reduction of zirconium oxide assumes that the latter dissolves in the fused barium chloride to form the double salt barium chlor-zirconate, ($BaZrCl_6$), a type of salt which is well known. If this salt is formed, the sodium will react with it to form metallic zirconium.

While the foregoing theories are offered as probable explanations of the process by which metallic oxides are reduced, it is to be understood that an interpretation of our invention is not to be based on such theories, which, although plausible in the light of present knowledge, may yet prove to be different from the actual mechanics of the reaction.

After the completion of the reaction, the products are allowed to cool and are then removed from the container. The excess sodium which collects on the top of the mass is first removed and may be used again, while the remaining portion of the mass is saturated with denatured alcohol to prevent a too violent reaction between the remaining sodium and water which is subsequently added to convert the former into the hydroxide. After the action between the sodium and the alcohol is completed, water is added slowly, by which the free sodium is converted into the hydroxide. A large volume of water is then added and the residue is washed by decantation. After removing most of the soluble salts by this method, the residue is treated with dilute acid, preferably hydrochloric acid in this instance, for the purpose of dissolving water-insoluble salts which may be present. The solution of these materials leaves only metallic zirconium in the solid state, which may be separated from the supernatant liquid by filtration, followed by a final washing with acetone or denatured alcohol.

For the production of metals other than zirconium, minor modifications in the method described above may be made, as such are well known to those skilled in the art, and other ways may readily be devised by which metallic oxides may be reduced to the metallic state by means of an alkali metal and a halide of either an alkali metal or an alkaline earth metal, but it is to be understood that such modifications come within the scope of this invention.

What is claimed is:

1. The method of producing refractory metals which consists in heating a metallic oxide, an alkali metal and either an alkali metal halide or an alkaline earth halide the base of which is a metal other than the alkali metal employed.

2. The method of producing metals from difficultly reducible oxides which consists in heating such oxides in the presence of an alkali metal and either an alkali metal halide or an alkaline earth halide the base of which is a metal other than the alkali metal employed.

3. The method of producing refractory metals which consists in heating an oxide of such metal, of an alkali metal and either an alkali metal halide or a halide of an alkaline earth metal the base of which is a metal other than the alkali metal employed.

4. The method of producing zirconium which consists in heating an oxide of zirconium in the presence of an alkali metal and either an alkali metal halide or a halide of an alkaline earth metal the base of which is a metal other than the alkali metal employed.

5. The method of producing refractory metals which consists in heating a metallic oxide in the presence of an alkaline earth halide and sodium.

6. The method of producing refractory metals which consists in heating a metallic oxide in the presence of barium chloride and an alkali metal.

7. The method of producing metals from difficultly reducible oxides which consists in heating such oxides in the presence of an alkaline earth halide and sodium.

8. The method of producing metals from difficultly reducible oxides which consists in heating such oxides in the presence of barium chloride and an alkali metal.

9. The method of producing metals from difficultly reducible oxides which consists in heating such oxides in the presence of barium chloride and sodium.

10. The method of producing zirconium which consists in heating an oxide of zirconium in the presence of an alkaline earth halide and sodium.

11. The method of producing zirconium which consists in heating an oxide of zirconium in the presence of barium chloride and an alkali metal.

12. The method of producing zirconium which consists in heating an oxide of zirconium in the presence of barium chloride and sodium.

13. The method of producing metals from difficultly reducible oxides, which consists in heating such oxides in an inert environment in the presence of an alkali metal and either an alkaline earth halide or an alkali metal halide, the base of which is a metal other than that of the alkali metal used.

14. The method of producing pure refractory metals, which consists in heating the oxides of said metals in the presence of an alkali metal and either an alkaline earth halide or an alkali metal halide, the base of which is a metal other than that of the alkali metal used, and treating the reaction product to eliminate all substances except the refractory metal.

15. The method of producing pure refractory metals, which consists in heating the oxides of said metals in the presence of an alkali metal and either an alkaline earth halide or an alkali metal halide, the base of which is a metal other than that of the alkali metal used, and treating the reaction product to eliminate all substances except the refractory metal, the reactions and treatment being effected in an inert environment.

16. The method which consists in forming a mixture of zirconium oxide, an alkaline earth halide and an alkali metal, raising the mixture to the reaction temperature in the absence of oxygen and nitrogen, cooling the same, and treating the reaction products to eliminate all except zirconium.

17. The method of producing refractory metals from their oxides which comprises heating the oxide in the presence of a substance to convert the oxide to a readily reducible compound and also in the presence of a reducing agent, said reactions taking place in the presence of each other.

18. The method of producing refractory metals which comprises heating an oxide of a refractory metal in the presence of a substance to convert the oxide to a halide and also in the presence of a reducing agent, such as an alkaline earth metal, said reactions taking place in the presence of each other.

19. The method of producing refractory metals which comprises heating an oxide of a refractory metal in the presence of a substance to convert the oxide to the chloride and also in the presence of an alkaline earth metal, said reactions taking place in the presence of each other.

20. The method of producing refractory metals which comprises heating an oxide of a refractory metal in the presence of a substance to convert the oxide to a halide and also in the presence of an alkaline earth metal and an alkali metal, said reactions taking place in the presence of each other.

21. The method of producing refractory metals which comprises heating an oxide of a refractory metal in the presence of a substance to convert the oxide to the chloride and also in the presence of an alkaline earth metal and an alkali metal, said reactions taking place in the presence of each other.

22. The method of producing refractory metals which comprises heating an oxide of a refractory metal in the presence of an alkaline earth metal halide to convert the oxide to a halide and also in the presence of an alkaline earth metal, said reactions taking place in the presence of each other.

23. The method of producing refractory metals which comprises heating an oxide of a refractory metal in the presence of an alkaline earth metal halide to convert the oxide to a halide and also in the presence of an alkaline earth metal and an alkali metal, said reactions taking place in the presence of each other.

24. The method of producing refractory metals which comprises heating an oxide of a refractory metal in the presence of an alkaline earth metal chloride to convert the oxide to a chloride and also in the presence of an alkaline earth metal, said reactions taking place in the presence of each other.

25. The method of producing refractory metals which comprises heating an oxide of a refractory metal in the presence of an alkaline earth metal chloride to convert the oxide to a chloride and also in the presence of an earth an alkaline earth metal and an alkali metal, said reactions taking place in the presence of each other.

26. The method of producing refractory metals which comprises heating a chloride of a refractory metal in the presence of an alkaline earth metal, said reduction being effected in the absence of oxygen and nitrogen.

27. The method of producing refractory metals which comprises heating a chloride of a refractory metal in the presence of an alkaline earth metal and an alkali metal, said reduction being effected in the absence of oxygen and nitrogen.

28. The step in the method of reducing the difficultly reducible oxides of the refractory metals which comprises heating the oxide of a refractory metal in the presence of a reducing agent, such as an alkali metal, and a fluxing agent.

29. The method of reducing the difficultly reducible oxides of the refractory metals which comprises heating a fluxing agent, such as an alkaline earth halide, and a reducing metal and an oxide of a refractory metal in the absence of air and nitrogen.

30. The step in the method of reducing the difficultly reducible oxides of the refractory metals which comprises heating the refractory oxide in the presence of a chemical substance, such as an alkaline earth halide, which will dissolve the undesirable products formed during the reaction and which also prevent the reduction from going to completion.

In testimony whereof, we have hereunto subscribed our names this 11th day of June, 1921.

JOHN WESLEY MARDEN.
CLETUS CLINTON VAN VOORHIS.